United States Patent
Jeong et al.

(10) Patent No.: US 11,329,798 B2
(45) Date of Patent: May 10, 2022

(54) APPARATUS AND METHOD FOR SET INTERSECTION OPERATION

(71) Applicant: SAMSUNG SDS CO., LTD., Seoul (KR)

(72) Inventors: Jin Hyuck Jeong, Seoul (KR); Joo Hee Lee, Seoul (KR); Eun Kyung Kim, Seoul (KR); Kyu Young Choi, Seoul (KR); Duk Jae Moon, Seoul (KR); Hyo Jin Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 43 days.

(21) Appl. No.: 17/079,982

(22) Filed: Oct. 26, 2020

(65) Prior Publication Data

US 2021/0194671 A1 Jun. 24, 2021

(30) Foreign Application Priority Data

Dec. 24, 2019 (KR) .................... 10-2019-0174543

(51) Int. Cl.
*H04L 9/00* (2022.01)
*H04L 9/12* (2006.01)
*G06F 17/16* (2006.01)
*H04L 9/06* (2006.01)

(52) U.S. Cl.
CPC ........ *H04L 9/0618* (2013.01); *H04L 2209/46* (2013.01)

(58) Field of Classification Search
CPC ......... H04L 9/0618; H04L 9/008; H04L 9/12; H04L 2209/46; H04L 2209/046; G06F 17/16
See application file for complete search history.

(56) References Cited

U.S. PATENT DOCUMENTS

| | | | | |
|---|---|---|---|---|
| 10,608,811 | B2* | 3/2020 | Chen | H04L 9/0618 |
| 2018/0367293 | A1* | 12/2018 | Chen | H04L 9/008 |
| 2021/0049231 | A1* | 2/2021 | Majnemer | G06F 9/45516 |
| 2021/0366584 | A1* | 11/2021 | Zhang | G16H 10/60 |

OTHER PUBLICATIONS

European Search Report For EP20204811.2 dated Mar. 26, 2021 from European patent office in a counterpart European patent application.
Hao Chen et al., " Fast Private Set Intersection from Homomorphic Encryption", IACR, International Association for Cryptologic Research, vol. 2017047:024218, 2017, pp. 1-19, XP061023045, DOI: 10.1145/3133956.3134061.

* cited by examiner

*Primary Examiner* — Alexander Lagor
*Assistant Examiner* — Vu V Tran
(74) *Attorney, Agent, or Firm* — The PL Law Group, PLLC (57) ABSTRACT

An apparatus for set intersection operation according to an embodiment includes a ciphertext acquisition unit configured to acquire a ciphertext for a first vector corresponding to a first subset of a universal set including a plurality of elements from an encryption apparatus, a transform unit configured to generate a second vector corresponding to a second subset of the universal set, a computation unit configured to generate a ciphertext for a third vector corresponding to an intersection of the first subset and the second subset, based on the ciphertext for the first vector and the second vector, and a ciphertext providing unit configured to provides the ciphertext for the third vector to the encryption apparatus.

12 Claims, 6 Drawing Sheets

APPARATUS AND METHOD FOR SET INTERSECTION OPERATION

CROSS-REFERENCE TO RELATED APPLICATION

This application claims the benefit under 35 USC § 119(a) of Korean Patent Application No. 10-2019-0174543, filed on Dec. 24, 2019, in the Korean Intellectual Property Office, the entire disclosure of which is incorporated herein by reference for all purposes.

BACKGROUND

1. Field

The disclosed embodiments relate to a cryptographic technique that supports a set intersection operation.

2. Description of Related Art

As a privacy issue of user data becomes more and more important, laws related to personal information protection such as the European GDPR are emerging. However, data owners or collectors have several difficulties in providing or using services using related information without such personal information protection issues. For this reason, while a privacy protection technique for personal information protection is receiving a lot of attention in recent years, research on a private set intersection (PSI) technique that determines whether or not data is matched in an encrypted state without exposing the data is being actively conducted.

The PSI technique is usually an example of multi-party computation (MPC), and is a technique that finds intersections (common elements) that overlap each other without exposing a set held by each of two entities. As existing methods of the PSI technique, there are hash-based PSI, public key cryptography-based PSI, circuit-based PSI, and oblivious transfer (OT) based PSI, etc. However, these conventional techniques have a problem in that a data transmission amount or a computation amount between two entities for set intersection operation increases as a comparison object increases, and thus the set intersection operation for large data is impossible or a computation speed is too slow.

SUMMARY

The disclosed embodiments are intended to provide an apparatus and method for set intersection operation.

An encryption apparatus according to an embodiment including a transform unit configured to generate a first vector corresponding to a first subset of a universal set including a plurality of elements, an encryption unit configured to generate a ciphertext for the first vector and provide the ciphertext to an apparatus for set intersection operation, a ciphertext acquisition unit configured to receive a ciphertext for a third vector corresponding to an intersection of the first subset and a second subset of the universal set from the apparatus for set intersection operation, and an intersection determination unit configured to decrypt the ciphertext for the third vector and determine the intersection based on the universal set and the third vector, in which the ciphertext for the third vector is generated based on the ciphertext for the first vector and a second vector corresponding to the second subset.

The ciphertext for the third vector may be generated by computing the ciphertext for the first vector with the second vector in an encrypted state.

The first vector may be a vector which includes n values corresponding to each of that correspond respectively to the plurality of elements (where n is the number of the plurality of elements), and in which a value corresponding to each element included in the first subset among the n values is 1 and the remaining values are 0, the second vector may be a vector which includes the n values and in which a value corresponding to each element included in the second subset among the n values is 1 and the remaining values are 0, and the third vector may be a vector which includes the n values and in which a value corresponding to each element included in the intersection among the n values is 1 and the remaining values are 0.

The universal set may be a set including n data as elements or a set including n sets each including m (where m is a natural number satisfying m≥2) elements as elements.

The third vector may be the same as an element-wise multiplication result between the first vector and the second vector.

An apparatus for set intersection operation according to an embodiment including a ciphertext acquisition unit configured to acquire a ciphertext for a first vector corresponding to a first subset of a universal set including a plurality of elements from an encryption apparatus, a transform unit configured to generate a second vector corresponding to a second subset of the universal set, a computation unit configured to generate a ciphertext for a third vector corresponding to an intersection of the first subset and the second subset, based on the ciphertext for the first vector and the second vector, and a ciphertext providing unit configured to provide the ciphertext for the third vector to the encryption apparatus.

The computation unit may be further configured to generate the ciphertext for the third vector by computing the ciphertext for the first vector with the second vector in an encrypted state.

The first vector may be a vector which includes n values corresponding to each of that correspond respectively to the plurality of elements (where n is the number of the plurality of elements), and in which a value corresponding to each element included in the first subset among the n values is 1 and the remaining values are 0, the second vector may be a vector which includes the n values and in which a value corresponding to each element included in the second subset among the n values is 1 and the remaining values are 0, and the third vector may be a vector which includes the n values and in which a value corresponding to each element included in the intersection among the n values is 1 and the remaining values are 0.

The universal set may be a set including n data as elements or a set including n sets each including m (where m is a natural number satisfying m≥2) elements as elements.

The third vector may be the same as an element-wise multiplication result between the first vector and the second vector.

An encryption method according to an embodiment including generating a first vector corresponding to a first subset of a universal set including a plurality of elements, generating a ciphertext for the first vector, providing the ciphertext to an apparatus for set intersection operation, receiving a ciphertext for a third vector corresponding to an intersection of the first subset and a second subset of the universal set from the apparatus for set intersection, decrypting the ciphertext for the third vector, and determining the intersection based on the universal set and the third vector, in which the ciphertext for the third vector is generated based on the ciphertext for the first vector and a second vector corresponding to the second subset.

The ciphertext for the third vector may be generated by computing the ciphertext for the first vector with the second vector in an encrypted state.

The first vector may be a vector which includes n values corresponding to each of that correspond respectively to the plurality of elements (where n is the number of the plurality of elements), and in which a value corresponding to each element included in the first subset among the n values is 1 and the remaining values are 0, the second vector may be a vector which includes the n values and in which a value corresponding to each element included in the second subset among the n values is 1 and the remaining values are 0, and the third vector may be a vector which includes the n values and in which a value corresponding to each element included in the intersection among the n values is 1 and the remaining values are 0.

The universal set may be a set including n data as elements or a set including n sets each including m (where m is a natural number satisfying m≥2) elements as elements.

The third vector may be the same as an element-wise multiplication result between the first vector and the second vector.

A method for set intersection operation according to an embodiment including acquiring a ciphertext for a first vector corresponding to a first subset of a universal set including a plurality of elements from an encryption apparatus, generating a second vector corresponding to a second subset of the universal set, generating a ciphertext for a third vector corresponding to an intersection of the first subset and the second subset, based on the ciphertext for the first vector and the second vector, and providing the ciphertext for the third vector to the encryption apparatus.

The generating of the ciphertext for the third vector may include generating the ciphertext for the third vector by computing the ciphertext for the first vector with the second vector in an encrypted state.

The first vector may be a vector which includes n values corresponding to each of that correspond respectively to the plurality of elements (where n is the number of the plurality of elements), and in which a value corresponding to each element included in the first subset among the n values is 1 and the remaining values are 0, the second vector may be a vector which includes the n values and in which a value corresponding to each element included in the second subset among the n values is 1 and the remaining values are 0, and the third vector may be a vector which includes the n values and in which a value corresponding to each element included in the intersection among the n values is 1 and the remaining values are 0.

The universal set may be a set including n data as elements or a set including n sets each including m (where m is a natural number satisfying m≥2) elements as elements.

The third vector may be the same as an element-wise multiplication result between the first vector and the second vector.

DETAILED DESCRIPTION

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless expressly used otherwise, a singular form includes a plural form. In this description, expressions such as "including" or "comprising" are intended to indicate any property, number, step, element, and some or combinations thereof, and such expressions should not be interpreted to exclude the presence or possibility of one or more other properties, numbers, steps, elements other than those described, and some or combinations thereof.

Figure 1:
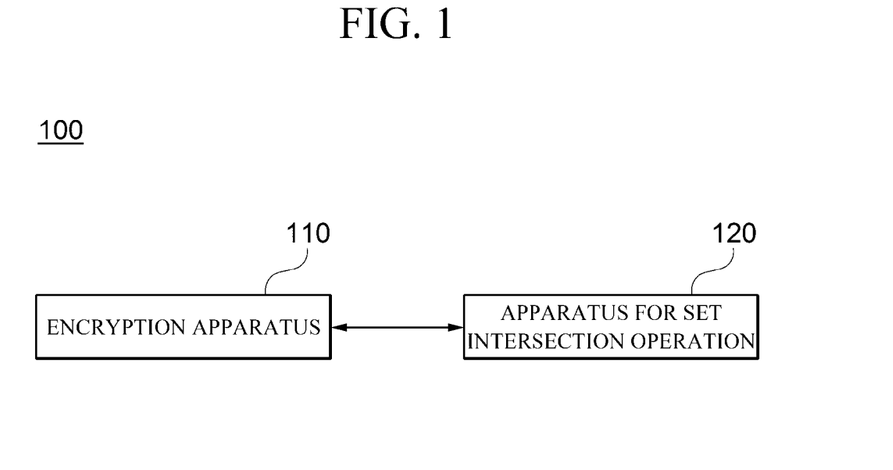
FIG. 1 is a block diagram of a set intersection operation system according to an embodiment.

FIG. 1 is a block diagram of a set intersection operation system according to an embodiment.

Referring to FIG. 1, a set intersection operation system 100 according to an embodiment includes an encryption apparatus 110 and an apparatus 120 for set intersection operation.

The intersection operation system 100 is a system for creating an intersection between data held by the encryption apparatus 110 and data held by the apparatus 120 for set intersection operation without directly exposing the data held by each of the encryption apparatus 110 and the apparatus 120 for set intersection operation to a counterpart.

Specifically, the encryption apparatus 110 and the apparatus 120 for set intersection operation may each hold a subset belonging to a universal set. In this case, the universal set may be pre-shared between the encryption apparatus 110 and the apparatus 120 for set intersection operation or may be determined through mutual agreement.

Meanwhile, the encryption apparatus 110 may create a first vector corresponding to a first subset of the universal set based on the universal set, and then create a ciphertext for the created first vector. In addition, the encryption apparatus 110 may provide the created ciphertext to the apparatus 120 for set intersection operation and request the apparatus 120 for set intersection operation to create an intersection between a second subset of the universal set and the first subset.

The apparatus 120 for set intersection operation may create a second vector corresponding to the second subset of the universal set based on the universal set. In addition, the apparatus 120 for set intersection operation may create a ciphertext for a third vector corresponding to the intersection of the first subset and the second subset through a computation between the created second vector and the ciphertext received from the encryption apparatus 110, and provide the created ciphertext to the encryption apparatus 110.

Meanwhile, when receiving the ciphertext for the third vector from the apparatus 120 for set intersection operation, the encryption apparatus 110 may create a third vector by decrypting the received ciphertext, and determine an intersection of the first subset and the second subset based on the universal set and the third vector.

Figure 2:
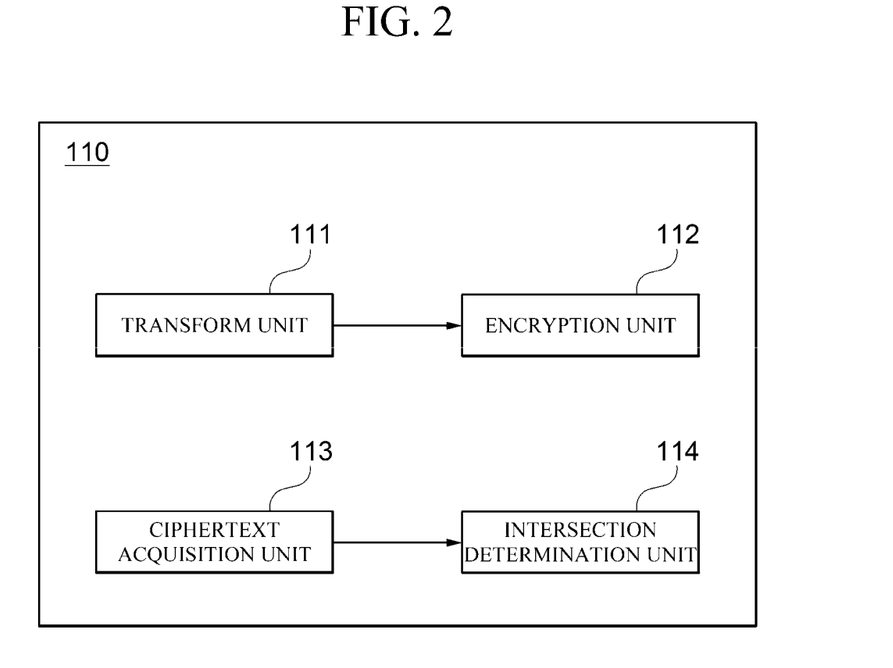
FIG. 2 is a configuration diagram of an encryption apparatus according to an embodiment.

FIG. 2 is a configuration diagram of an encryption apparatus according to an embodiment.

Referring to FIG. 2, the encryption apparatus 110 according to an embodiment includes a transform unit 111, an encryption unit 112, a ciphertext acquisition unit 113, and an intersection determination unit 114.

The transform unit 111 creates a first vector corresponding to the first subset of the universal set based on the universal set including a plurality of elements.

In this case, according to an embodiment, the universal set may be pre-shared between the encryption apparatus 110 and the apparatus 120 for set intersection operation or may be determined through mutual agreement.

In addition, according to an embodiment, the universal set may be a set including n (where n is a natural number satisfying n≥2) data as elements or a set including n sets each including m (where m is a natural number satisfying m≥2) elements as elements.

For example, assuming an arbitrary set $S=\{x_1, x_2, x_3, x_4, x_5, x_6, x_7, x_8, x_9, x_{10}\}$ containing 10 numerical data elements, the universal set U may be a set S itself (i.e., U=S). In this case, the first subset of the universal set may be, for example, a set including one or more of the elements included in the set S (e.g., $\{x_1, x_3\}$).

As another example, the universal set U may be, for example, a set including, as an element, each of a plurality of sets created by dividing the set S described above such that elements do not overlap, such as $S_1=\{x_1, x_2\}$, $S_2=\{x_3, x_4\}$, $S_3=\{x_5, x_6\}$, $S_4=\{x_7, x_8\}$ and $S_5=\{x_9, x_{10}\}$. That is, in this case, the universal set U may be $U=\{S_1, S_2, S_3, S_4, S_5\}$, and the first subset is a set including one or more of the elements included in the universal set U (e.g., $\{S_1, S_4\}$).

As another example, the universal set U may be one of sets $S_1, S_2, S_3, S_4$, and $S_5$ created by dividing the set S described above. For example, when the universal set U is $U=S_1=\{x_1, x_2\}$, the first subset may be a set (e.g., $\{x_2\}$) including one or more of the elements included in the set $S_1$.

Meanwhile, according to an embodiment, when n elements are included in the universal set, the first vector corresponding to the first subset is an n-dimensional vector including n values that correspond respectively to n elements. Specifically, the first vector may include n values that correspond respectively to the n elements included in the universal set, but the value corresponding to each element included in the first subset among n values may be 1 and the remaining values may be 0.

For example, assume that the universal set is $U=\{x_1, x_2, x_3, x_4, x_5, x_6, x_7, x_8, x_9, x_{10}\}$, and the first subset is $M_1=\{x_1, x_5, x_7\}$. In this case, a first vector $\vec{V}_1$ corresponding to the first subset may be a vector which includes 10 values that correspond respectively to elements included in the universal set U, such as $\vec{V}_1=[1, 0, 0, 0, 1, 0, 1, 0, 0, 0]$, and in which a value corresponding to each of $x_1, x_5$, and $x_7$, which are elements included in the first subset of 10 values, is 1 and the remaining values are 0.

The encryption unit 112 creates a ciphertext for the first vector corresponding to the first subset and provides the ciphertext for the created first vector to the apparatus 120 for set intersection operation.

According to an embodiment, the encryption unit 112 may create a ciphertext for the first vector by using various encryption techniques that enable a ciphertext for an n-dimensional vector $\vec{V}_3$ corresponding to an element-wise multiplication result between an n-dimensional vector $\vec{V}_1$ and an n-dimensional vector $\vec{V}_2$ to be created by computing a ciphertext for $\vec{V}_1$ with $\vec{V}_2$ in an encrypted state.

As a specific example, the encryption unit 112 may create a ciphertext for a vector corresponding to the first subset by using encryption algorithms of various known encryption techniques that support a computation according to Equation 1 below, such as, Rivest Shamir Adleman (RSA) algorithm, discrete log-based algorithm (e.g., El Garmal algorithm), and Homomorphic encryption.

$$C=Enc(\vec{V}_1)\odot\vec{V}_2=Enc(\vec{V}_1\odot\vec{V}_2)=Enc(\vec{V}_3) \qquad \text{[Equation 1]}$$

In Equation 1, $\odot$ means element-wise multiplication between two vectors

The ciphertext acquisition unit 113 receives a ciphertext for the third vector corresponding to an intersection of the first subset and the second subset of the universal set from the apparatus 120 for set intersection operation.

In this case, the ciphertext for the third vector received from the apparatus 120 for set intersection operation is created based on the ciphertext for the first vector and the second vector corresponding to the second subset.

Specifically, the ciphertext for the third vector received from the apparatus 120 for set intersection operation may be created, for example, by computing the ciphertext for the first vector with the second vector in an encrypted state as in Equation 1 described above.

Meanwhile, according to an embodiment, when n elements are included in the universal set, the second vector corresponding to the second subset and the third vector corresponding to the intersection may be n-dimensional vectors each including n values that correspond respectively to n elements.

Specifically, the second vector may be a vector which includes n values that correspond respectively to the n elements included in the universal set, and in which the value corresponding to each element included in the second subset among n values is 1 and the remaining values are 0.

In addition, the third vector may be a vector which includes n values that correspond respectively to the n elements included in the universal set, and in which the value corresponding to each element included in the intersection of the first subset and the second subset among n values is 1 and the remaining values are 0.

For example, assume that the universal set is $U=\{x_1, x_2, x_3, x_4, x_5, x_6, x_7, x_8, x_9, x_{10}\}$, the first subset is $M_1=\{x_5\}$, and the second subset is $M_2=\{x_2, x_5, x_7\}$. In this case, the first vector $\vec{V}_1$ corresponding to the first subset and the second vector $\vec{V}_2$ corresponding to the second subset may be $\vec{V}_1=[0, 0, 0, 0, 1, 0, 0, 0, 0, 0]$ and $\vec{V}_2=[0, 1, 0, 0, 1, 0, 1, 0, 0, 0]$, respectively. In addition, since the intersection of the first subset and the second subset is $M_3=M_1 \cap M_2=\{x_5\}$, the third vector $\vec{V}_3$ may be $\vec{V}_3=[0, 0, 0, 0, 1, 0, 0, 0, 0, 0]$, which is the same as the element-wise multiplication result between $\vec{V}_1$ and $\vec{V}_2$.

The intersection determination unit 114 acquires the third vector by decrypting the ciphertext for the third vector received from the apparatus 120 for set intersection operation.

In this case, the intersection determination unit 114 may decrypt the ciphertext for the third vector by using a decryption algorithm of the encryption technique used for encryption in the encryption unit 112.

Meanwhile, when the third vector is acquired through decryption, the intersection determination unit 114 determines the intersection of the first subset and the second subset based on the universal set and the acquired third vector.

For example, assuming the universal set is $U=\{x_1, x_2, x_3, x_4, x_5, x_6, x_7, x_8, x_9, x_{10}\}$ and the third vector is $\vec{V}_3=[0, 0, 0, 0, 1, 0, 0, 0, 0, 0]$, since only the value corresponding to $x_5$ among 10 values included in $\vec{V}_3$ is 1 and the remaining values are 0, the intersection determination unit 114 may determine that the intersection of the first subset and the second as a subset $M_3=M_1 \cap M_2=\{x_5\}$.

Figure 3:
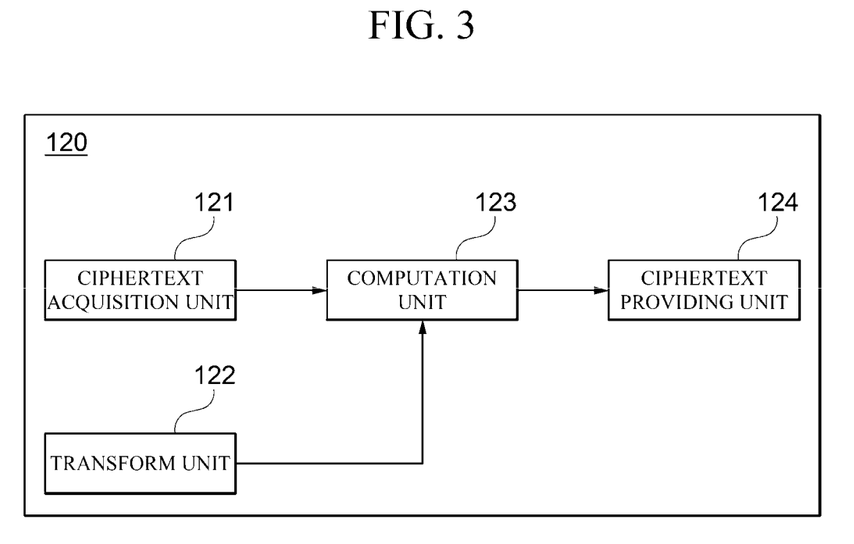
FIG. 3 is a configuration diagram of an apparatus for set intersection according to an embodiment.

FIG. 3 is a configuration diagram of an apparatus for set intersection operation according to an embodiment.

Referring to FIG. 3, an apparatus 120 for set intersection operation according to an embodiment includes a ciphertext acquisition unit 121, a transform unit 122, a computation unit 123, and a ciphertext providing unit 124.

The ciphertext acquisition unit 121 acquires a ciphertext for the first vector corresponding to the first subset of the universal set from the encryption apparatus 110.

In this case, the ciphertext for the first vector acquired from the encryption apparatus 110 may be created in the same manner as described with reference to FIG. 2.

The transform unit 122 creates a second vector corresponding to the second subset of the universal set based on the universal set.

In this case, the transform unit 122 may create the second vector in the same manner as the method of creating the first vector in the encryption apparatus 110.

Specifically, according to an embodiment, when n elements are included in the universal set, the second vector corresponding to the second subset may be an n-dimensional vector including n values that correspond respectively to the n elements. Specifically, the second vector may be a vector which includes n values that correspond respectively to the n elements included in the universal set, and in which the value corresponding to each element included in the first subset among the n values is 1 and the remaining values are 0.

For example, assume that the universal set is $U=\{x_1, x_2, x_3, x_4, x_5, x_6, x_7, x_8, x_9, x_{10}\}$, and the second subset is $M_2=\{x_7\}$. In this case, a second vector $\vec{V}_2$ corresponding to the second subset may be a vector which includes 10 values that correspond respectively to the elements included in the universal set U, such as $\vec{V}_2=[0, 0, 0, 0, 0, 0, 1, 0, 0, 0]$, and in which a value corresponding to $x_7$, which is an element included in the second subset of 10 values, is 1 and the remaining values are 0.

The computation unit 123 creates a ciphertext for the third vector corresponding to the intersection of the first subset and the second subset based on the ciphertext for the first vector acquired from the encryption apparatus 110 and the second vector.

Specifically, the computation unit 123 may create a ciphertext for the third vector by computing the ciphertext for the first vector with the second vector in an encrypted state as in Equation 1 described above.

Meanwhile, according to an embodiment, when n elements are included in the universal set, the third vector may be an n-dimensional vector including n values that correspond respectively to the n elements. Specifically, the third vector may be a vector which includes n values that correspond respectively to the n elements included in the universal set, and in which a value corresponding to each element included in the intersection of the first subset and the second subset among n values is 1 and the remaining values are 0.

For example, assume that the universal set is $U=\{x_1, x_2, x_3, x_4, x_5, x_6, x_7, x_8, x_9, x_{10}\}$, the first subset is $M_1=\{x_5\}$, and the second subset is $M_2=\{x_2, x_5, x_7\}$. In this case, the first vector $\vec{V}_1$ corresponding to the first subset and the second vector $\vec{V}_2$ corresponding to the second subset may be $\vec{V}_1=[0, 0, 0, 0, 1, 0, 0, 0, 0, 0]$ and $\vec{V}_2=[0, 1, 0, 0, 1, 0, 1, 0, 0, 0]$, respectively. In addition, since the intersection of the first subset and the second subset is $M_3=M_1 \cap M_2=\{x_5\}$, the third vector $\vec{V}_3$ may be $\vec{V}_3=[0, 0, 0, 0, 1, 0, 0, 0, 0, 0]$, which is the same as the element-wise multiplication result between $\vec{V}_1$ and $\vec{V}_2$.

The ciphertext providing unit 124 provides the ciphertext for the third vector created by the computation unit 123 to the encryption apparatus 110.

Figure 4:
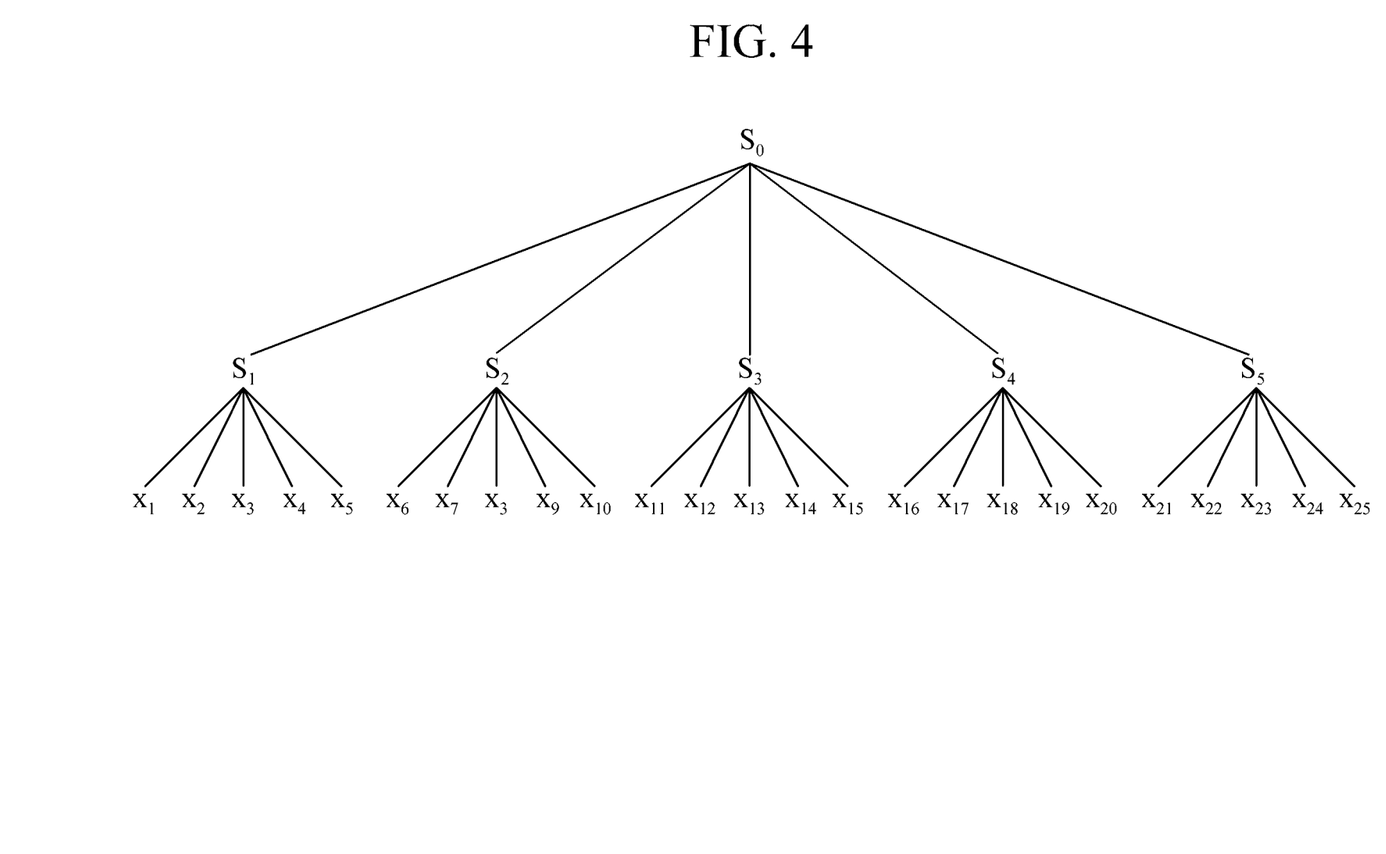
FIG. 4 is a diagram illustrating a relationship between subsets created by iteratively dividing a set including a plurality of elements according to an embodiment in a tree diagram.

FIG. 4 is a diagram illustrating a relationship between subsets created by iteratively dividing a set including a plurality of elements according to an embodiment in a tree diagram.

Specifically, FIG. 4 is a tree diagram for a case in which a set $S=\{x_1, x_2, \ldots, x_{24}, x_{25}\}$ including 25 elements is divided into 5 subsets of $S_1=\{x_1, x_2, x_3, x_4, x_5\}$, $S_2=\{x_6, x_7, x_8, x_9, x_{10}\}$, $S_3=\{x_{11}, x_{12}, x_{13}, x_{14}, x_{15}\}$, $S_4=\{x_{16}, x_{17}, x_{18}, x_{19}, x_{20}\}$, and $S_5=\{x_{21}, x_{22}, x_{23}, x_{24}, x_{25}\}$ each including 5 elements, and $S_0$, which is the topmost node in the tree diagram, represents a set (i.e., $S_0=\{S_1, S_2, S_3, S_4, S_5\}$) including each subset S1, S2, S3, S4, and S5 as elements.

Information on the sets S, $S_0$, $S_1$, $S_2$, $S_3$, $S_4$, and $S_5$ may be pre-shared between the encryption apparatus 110 and the apparatus 120 for set intersection operation.

Meanwhile, in the example illustrated in FIG. 4, assume that the encryption apparatus 110 holds $M_1=\{x_7\}$, which is a subset of the set S, and the apparatus 120 for set intersection operation holds $M_2=\{x_1, x_6, x_7\}$, which is a subset of S. In this case, the encryption apparatus 110 may acquire a subset $M_3=M_1 \cap M_2$ of $M_1$ and $M_2$ by performing the procedures illustrated in FIG. 5 or 6 with the apparatus 120 for set intersection operation.

Figure 5:
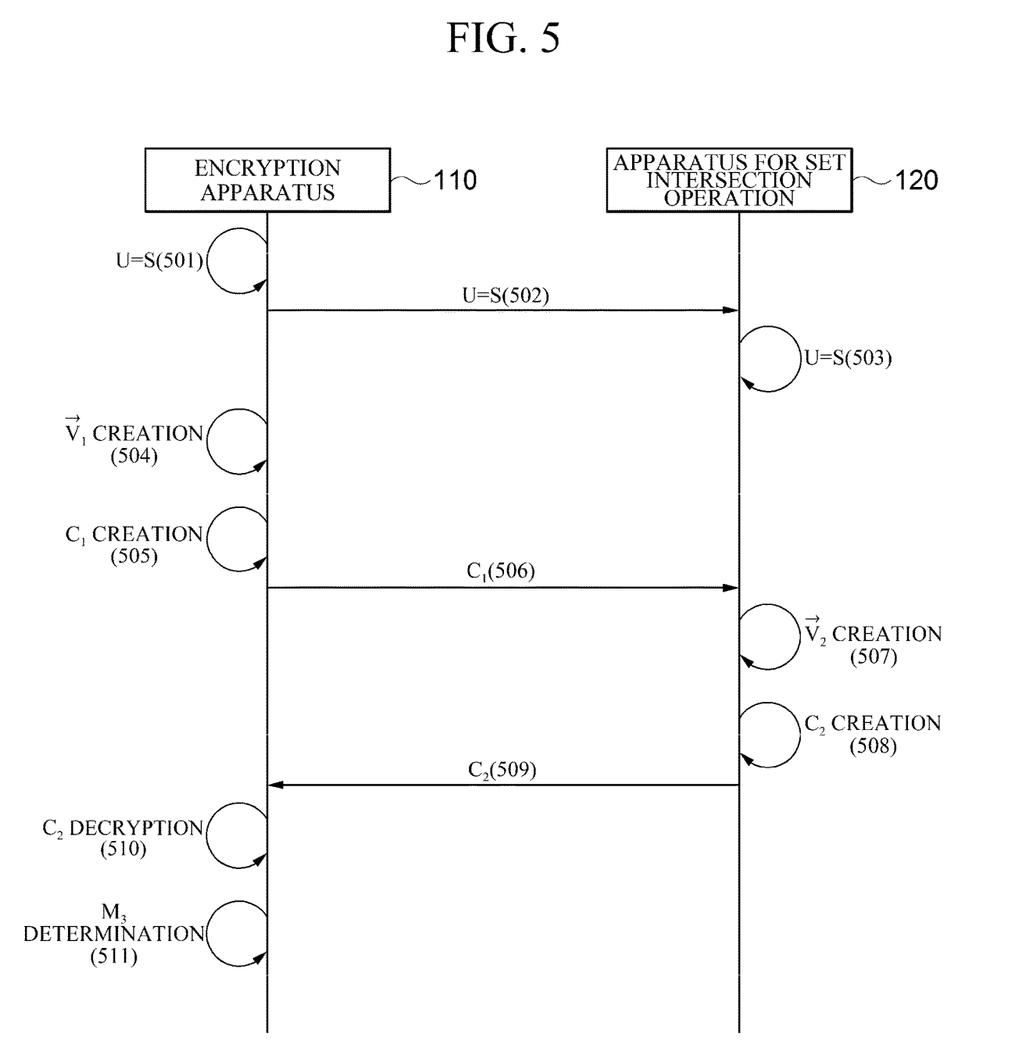
FIG. 5 is a procedural chart illustrating a process of acquiring an intersection performed between an encryption apparatus and the apparatus for set intersection operation according to an embodiment.

Specifically, FIG. 5 is a procedural chart illustrating a process of acquiring an intersection performed between the encryption apparatus and the apparatus for set intersection operation according to an embodiment.

Referring to FIG. 5, first, the encryption apparatus 110 sets the universal set U to S (i.e., U=S={$x_1$, $x_2$, . . . , $x_{24}$, $x_{25}$}) (501).

Thereafter, the encryption apparatus 110 requests the apparatus 120 for set intersection operation to set the universal set U to S (502), and the apparatus 120 for set intersection operation sets the universal set U to S according to the request of the encryption apparatus (503).

Thereafter, the encryption apparatus 110 creates the vector $\vec{V}_1$ corresponding to the set $M_1$ (504).

In this case, the vector $\vec{V}_1$ may be a vector which has 25 values that correspond respectively to the elements included in the universal set U, and in which a value corresponding to an element $x_7$ included in the set M1 is 1 and the remaining values are 0 (i.e., $\vec{V}_1$=[0, 0, 0, 0, 0, 0, 1, 0, 0, 0, 0, 0, 0, 0, 0, 0, 0, 0, 0, 0, 0, 0, 0, 0, 0]).

Thereafter, the encryption apparatus 110 creates a ciphertext $C_1$=Enc($\vec{V}_1$) for $\vec{V}_1$ (505), and then provides the created ciphertext $C_1$ to the apparatus 120 for set intersection operation (506).

Meanwhile, the apparatus 120 for set intersection operation creates the vector $\vec{V}_2$ corresponding to the set $M_2$ (507).

In this case, the vector $\vec{V}_2$ may be a vector which has 25 values that correspond respectively to the elements included in the universal set U, and in which the values that correspond respectively to the elements $x_1$, $x_6$ and $x_7$ included in the set $M_2$ are 1 and the remaining values are 0 (i.e., $\vec{V}_2$=[1, 0, 0, 0, 0, 1, 1, 0, 0, 0, 0, 0, 0, 0, 0, 0, 0, 0, 0, 0, 0, 0, 0, 0, 0]).

Meanwhile, the apparatus 120 for set intersection operation creates a ciphertext $C_2$=Enc($\vec{V}_3$) for the vector $\vec{V}_3$ corresponding to the intersection $M_3$ of $M_1$ and $M_2$ based on the ciphertext $C_1$ and the vector $\vec{V}_2$ (508).

In this case, the vector $\vec{V}_3$ may be a vector which has 25 values that correspond respectively to the elements included in the universal set U, and in which the value corresponding to the element $x_7$ included in the set $M_3$ is 1 and the remaining values are 0 (i.e., $\vec{V}_3$=[0, 0, 0, 0, 0, 0, 1, 0, 0, 0, 0, 0, 0, 0, 0, 0, 0, 0, 0, 0, 0, 0, 0, 0, 0]), and this is the same as the element-wise multiplication result between $\vec{V}_1$ and $\vec{V}_2$.

Meanwhile, the apparatus 120 for set intersection operation provides a ciphertext $C_2$ for the vector $\vec{V}_3$ to the encryption apparatus 110 (509).

Thereafter, the encryption apparatus 110 decrypts the ciphertext $C_2$ to acquire the vector $\vec{V}_3$ (510), and determines intersection $M_3$ based on the universal set and the acquired vector $\vec{V}_3$ (511).

Specifically, as described above, since $\vec{V}_3$ is a vector in which the value corresponding to the element $x_7$ is 1 and the remaining values are 0, the encryption apparatus 110 determines the intersection $M_3$ as $M_3$={$x_7$} based on $\vec{V}_3$.

Figure 6:
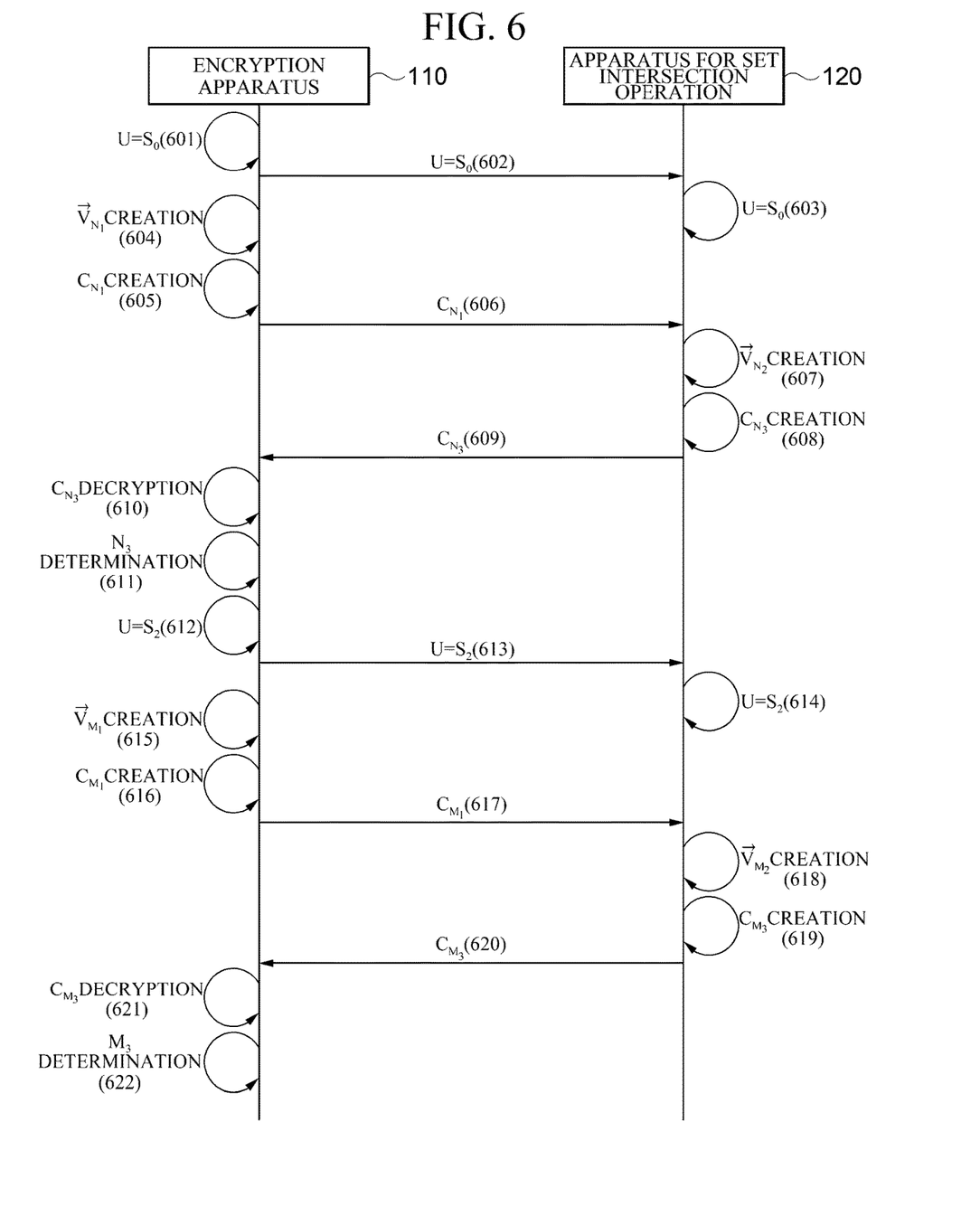
FIG. 6 is a procedural chart illustrating a process of acquiring an intersection performed between an encryption apparatus and an apparatus for set intersection according to another embodiment.

FIG. 6 is a procedural chart illustrating a process of acquiring an intersection performed between an encryption apparatus and an intersection operation apparatus according to another embodiment.

Referring to FIGS. 4 and 6, first, the encryption apparatus 110 sets the universal set U to S0 (i.e., U=$S_0$={$S_1$, $S_2$, $S_3$, $S_4$, $S_5$}) (601).

Thereafter, the encryption apparatus 110 requests the apparatus 120 for set intersection operation to set the universal set U to $S_0$ (602), and the apparatus 120 for set intersection operation sets the universal set U to $S_0$ according to the request of the encryption device 110 (603).

Thereafter, the encryption apparatus 110 creates a vector $\vec{V}_{N_1}$ corresponding to a subset $N_1$={$S_2$} of $S_0$ including $S_2$, which is a parent node of the element $x_7$ included in the set $M_1$, as an element based on the tree diagram illustrated in FIG. 4 (604).

In this case, the vector $\vec{V}_{N_1}$ may be a vector which has 5 values that correspond respectively to the elements included in the universal set U (i.e., $S_0$), and in which the value corresponding to the element $S_2$ included in the set $N_1$ is 1, and the remaining values are 0 (i.e., $\vec{V}_{N_1}$=[0, 1, 0, 0, 0]).

Thereafter, the encryption apparatus 110 creates a ciphertext $C_{N_1}$=Enc($\vec{V}_{N_1}$) for $\vec{V}_{N_1}$ (605), and then provides the created ciphertext $C_{N_1}$ to the apparatus 120 for set intersection operation (606).

Meanwhile, in the tree diagram illustrated in FIG. 4, the apparatus 120 for set intersection operation creates a vector $\vec{V}_{N_2}$ corresponding to a subset $N_2$ of $S_0$ including $S_1$ and $S_2$, which are parent nodes of each of the elements $x_1$, $x_6$, and $x_7$ included in the set $M_2$, as elements (607).

In this case, the vector $\vec{V}_{N_2}$ may be a vector which has 5 values that correspond respectively to the elements included in the universal set U (i.e., $S_0$), and in which the values that correspond respectively to the elements $S_1$ and $S_2$ included in the set $N_2$ is 1 and the remaining values are 0 (i.e., $\vec{V}_{N_2}$=[1, 1, 0, 0, 0]).

Thereafter, the apparatus 120 for set intersection operation creates a ciphertext $C_{N_3}$=Enc($\vec{V}_{N_3}$) for the vector $\vec{V}_{N_3}$ corresponding to an intersection $N_3$ of $N_1$ and $N_2$ based on the ciphertext $C_{N_1}$ and the vector $\vec{V}_{N_2}$ (608).

In this case, the vector $\vec{V}_{N_3}$ may be a vector which has 5 values that correspond respectively to the elements included in the universal set U (i.e., $S_0$), and in which the value corresponding to the element $S_2$ included in the intersection $N_3$ is 1 and the remaining values are 0 (i.e., $\vec{V}_{N_3}$=[0, 1, 0, 0, 0]), and this is the same as the element-wise multiplication result between $\vec{V}_{N_1}$ and $\vec{V}_{N_2}$.

Thereafter, the apparatus 120 for set intersection operation provides the ciphertext $C_{N_3}$ for the vector $\vec{V}_{N_3}$ to the encryption apparatus 110 (609).

Meanwhile, the encryption apparatus 110 decrypts the ciphertext $C_{N_3}$ to acquire a vector $\vec{V}_{N_3}$ (610), and determines the intersection $N_3$ of $N_1$ and $N_2$ based on the universal set and the acquired vector $\vec{V}_{N_3}$ (611).

Specifically, as described above, since $\vec{V}_{N_3}$ is a vector in which the value corresponding to $S_2$ among the elements included in the universal set U (i.e., $S_0$) is 1 and the remaining values are 0, the encryption apparatus 110 may determine the intersection $N_3$ as $N_3$={$S_2$} based on $\vec{V}_{N_3}$.

Thereafter, the encryption apparatus 110 sets the universal set U to the set $S_2$, which is an element included in $N_3$ (i.e., U=$S_2$={$x_6$, $x_7$, $x_8$, $x_9$, $x_{10}$}) (612).

Thereafter, the encryption apparatus 110 requests the apparatus 120 for set intersection operation to set the universal set U to $S_2$ (613), and the apparatus 120 for set intersection operation sets the universal set U to $S_2$ according to the request of the encryption apparatus 110 (614).

Thereafter, the encryption apparatus 110 creates a vector $\vec{V}_{M_1}$ corresponding to the set $M_1$ (615).

In this case, the vector $\vec{V}_{M_1}$ may be a vector which has 5 values that correspond respectively to the elements included in the universal set U (i.e., $S_2$), and in which the value corresponding to the element $x_7$ included in the set $M_1$ is 1 and the remaining values are 0 (i.e., $\vec{V}_{M_1}=[0, 1, 0, 0, 0]$).

Thereafter, the encryption apparatus 110 creates a ciphertext $C_{M_1}=Enc(\vec{V}_{M_1})$ for $\vec{V}_{M_1}$ (616), and then provides the created ciphertext $C_{M_1}$ to the apparatus 120 for set intersection operation (617).

Meanwhile, the apparatus 120 for set intersection operation creates a vector $\vec{V}_{M_2}$ corresponding to the set $M_2$ (618).

In this case, the vector $\vec{V}_{M_2}$ may be a vector which has 5 values that correspond respectively to the elements included in the universal set U (i.e., $S_2$), and in which the values that correspond respectively to the elements $x_6$ and $x_7$ included in the universal set are 1 and the remaining values are 0 (i.e., $\vec{V}_{M_2}=[1, 1, 0, 0, 0]$).

Thereafter, the apparatus 120 for set intersection operation creates a ciphertext $C_{M_3}=Enc(\vec{V}_{M_3})$ for the vector $\vec{V}_{M_3}$ corresponding to the intersection $M_3$ of $M_1$ and $M_2$ based on the ciphertext $C_{M_1}$ and the vector $\vec{V}_{M_2}$ (619).

In this case, the vector $\vec{V}_{M_3}$ may be a vector which has 5 values that correspond respectively to the elements included in the universal set U (i.e., $S_2$), and in which the value corresponding to the element X included in the set $M_3$ is 1 and the remaining values are 0 (i.e., $\vec{V}_{M_3}=[0, 1, 0, 0, 0]$), and this is the same as the element-wise multiplication result between $\vec{V}_{M_1}$ and $\vec{V}_{M_2}$.

Meanwhile, the apparatus 120 for set intersection operation provides the ciphertext $C_{M_3}$ for the vector $\vec{V}_{M_3}$ to the encryption apparatus 110 (620).

Hereafter, the encryption apparatus 110 decrypts the ciphertext $C_{M_3}$ to acquire the vector $\vec{V}_{M_3}$ (621), and determines the intersection $M_3$ of $M_1$ and $M_2$ based on the universal set and the acquired vector $\vec{V}_{M_3}$ (622).

Specifically, as described above, since $\vec{V}_{M_3}$ is a vector in which the value corresponding to $x_7$ among the elements included in the universal set U (i.e., $S_2$) is 1 and the remaining values are 0, the encryption apparatus 110 may determine the intersection $M_3$ as $M_3=\{x_7\}$ based on $\vec{V}_{M_3}$.

Figure 7:
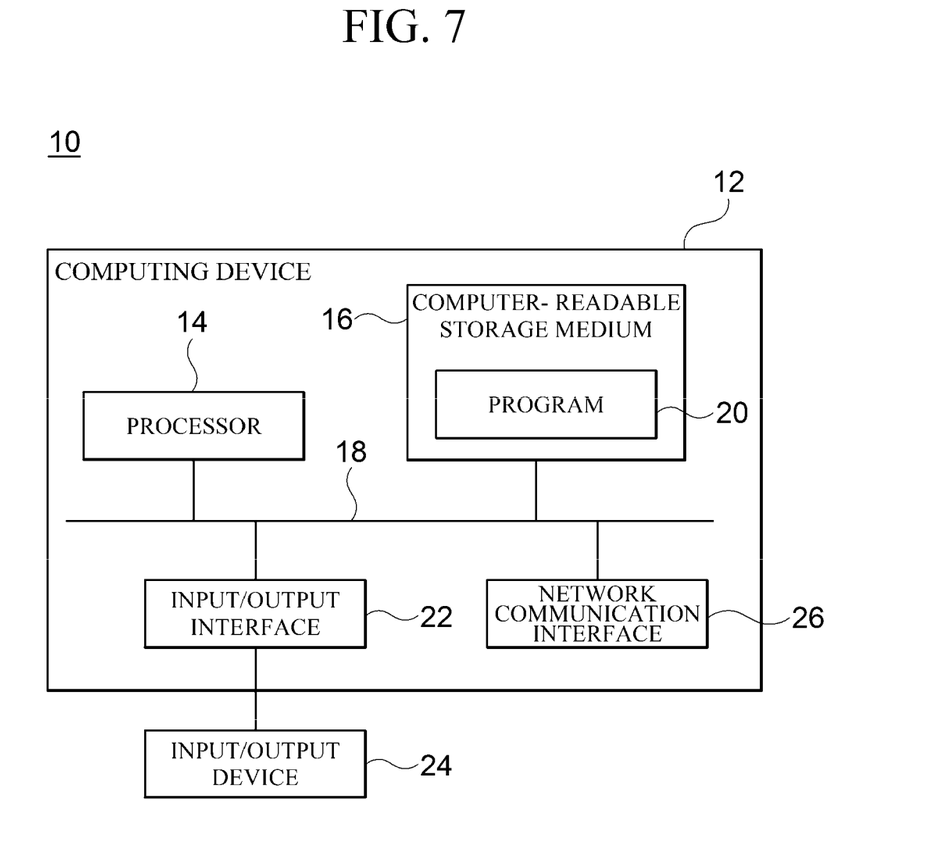
FIG. 7 is a block diagram for illustratively describing a computing environment including a computing device suitable for use in example embodiments.

FIG. 7 is a block diagram for illustratively describing a computing environment 10 that includes a computing device suitable for use in the exemplary embodiment. In the illustrated embodiment, each component may have different functions and capabilities in addition to those described below, and additional components may be included in addition to those described below.

The illustrated computing environment 10 includes a computing device 12. In an embodiment, the computing device 12 may be one or more components included in the encryption apparatus 110 or the apparatus 120 for set intersection operation according to embodiments of the present invention. The computing device 12 includes at least one processor 14, a computer-readable storage medium 16, and a communication bus 18. The processor 14 may cause the computing device 12 to perform steps according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform steps according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

According to embodiments of the present invention, an intersection between data held by two entities is created without exposing the data held by the two entities to each other, but a computation amount can be reduced while maintaining a transmission amount between the two entities for a set intersection operation at the same level or less than that of the conventional PSI technique, and thus an efficient set intersection operation is possible even if the amount of data increases.

Although the present invention has been described in detail through representative examples as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An encryption apparatus comprising:
    a transformer to generate a first vector corresponding to a first subset of a universal set including a plurality of elements;
    an encrypter to generate a ciphertext for the first vector and provide the ciphertext to an apparatus for set intersection operation;
    a ciphertext acquiser to receive a ciphertext for a third vector corresponding to an intersection of the first subset and a second subset of the universal set from the apparatus for set intersection operation; and an intersection determinator to decrypt the ciphertext for the third vector and determine the intersection based on the universal set and the third vector, wherein the ciphertext for the third vector is generated based on the ciphertext for the first vector and a second vector corresponding to the second subset, wherein the first vector is a vector which includes n values corresponding to each of that correspond respectively to the plurality of elements, wherein n is the number of the plurality of elements, and in which a value corresponding to each element included in the first subset among the n values is 1 and the remaining values are 0; the second vector is a vector which includes the n values and in which a value corresponding to each element included in the second subset among the n values is 1 and the remaining values are 0; and the third vector is a vector which includes the n values and in which a value 5 corresponding to each element included in the intersection among the n values is 1 and the remaining values are 0, wherein the third vector is the same as an element-wise multiplication result between the first vector and the second vector.

2. The encryption apparatus of claim 1, wherein the ciphertext for the third vector is generated by computing the ciphertext for the first vector with the second vector in an encrypted state.

3. The encryption apparatus of claim 1, wherein the universal set is a set including n data as elements or a set including n sets each including m elements as elements, where m is a natural number satisfying m>2.

4. An apparatus for set intersection operation, the apparatus comprising:
  a ciphertext acquiser to acquire a ciphertext for a first vector corresponding to a first subset of a universal set including a plurality of elements from an encryption apparatus;
  a transformer to generate a second vector corresponding to a second subset of the universal set;
  a computater to generate a ciphertext for a third vector corresponding to an intersection of the first subset and the second subset, based on the ciphertext for the first vector and the second vector; and
  a ciphertext provider to provide the ciphertext for the third vector to the encryption apparatus, wherein the first vector is a vector which includes n values corresponding to each of that correspond respectively to the plurality of elements, wherein n is the number of the plurality of elements, and in which a value corresponding to each element included in the first subset among the n values is 1 and the remaining values are 0; the second vector is a vector which includes the n values and in which a value corresponding to each element included in the second subset among the n values is 1 and the remaining values are 0; and the third vector is a vector which includes the n values and in which a value 5 corresponding to each element included in the intersection among the n values is 1 and the remaining values are 0, wherein the third vector is the same as an element-wise multiplication result between the first vector and the second vector.

5. The apparatus of claim 4, wherein the computation unit is further configured to generate the ciphertext for the third vector by computing the ciphertext for the first vector with the second vector in an encrypted state.

6. The apparatus of claim 4, wherein the universal set is a set including n data as elements or a set including n sets each including m elements as elements, where m is a natural number satisfying m>2.

7. An encryption method comprising:
  generating a first vector corresponding to a first subset of a universal set including a plurality of elements;
  generating a ciphertext for the first vector;
  providing the ciphertext to an apparatus for set intersection operation;
  receiving a ciphertext for a third vector corresponding to an intersection of the first subset and a second subset of the universal set from the apparatus for set intersection operation;
  decrypting the ciphertext for the third vector; and determining the intersection based on the universal set and the third vector, wherein the ciphertext for the third vector is generated based on the ciphertext for the first vector and a second vector corresponding to the second subset, wherein the first vector is a vector which includes n values corresponding to each of that correspond respectively to the plurality of elements, wherein n is the number of the plurality of elements, and in which a value corresponding to each element included in the first subset among the n values is 1 and the remaining values are 0; the second vector is a vector which includes the n values and in which a value corresponding to each element included in the second subset among the n values is 1 and the remaining values are 0; and the third vector is a vector which includes the n values and in which a value 5 corresponding to each element included in the intersection among the n values is 1 and the remaining values are 0, wherein the third vector is the same as an element-wise multiplication result between the first vector and the second vector.

8. The encryption method of claim 7, wherein the ciphertext for the third vector is generated by computing the ciphertext for the first vector with the second vector in an encrypted state.

9. The encryption method of claim 7, wherein the universal set is a set including n data as elements or a set including n sets each including m elements as elements, where m is a natural number satisfying m>2.

10. A method for set intersection operation, the method comprising:
  acquiring a ciphertext for a first vector corresponding to a first subset of a universal set including a plurality of elements from an encryption apparatus;
  generating a second vector corresponding to a second subset of the universal set;
  generating a ciphertext for a third vector corresponding to an intersection of the first subset and the second subset, based on the ciphertext for the first vector and the second vector; and
  providing the ciphertext for the third vector to the encryption apparatus, wherein the first vector is a vector which includes n values corresponding to each of that correspond respectively to the plurality of elements, wherein n is the number of the plurality of elements, and in which a value corresponding to each element included in the first subset among the n values is 1 and the remaining values are 0; the second vector is a vector which includes the n values and in which a value corresponding to each element included in the second subset among the n values is 1 and the remaining values are 0; and the third vector is a vector which includes the n values and in which a value 5 corresponding to each element included in the intersection among the n values is 1 and the remaining values are 0, wherein the third vector is the same as an element-wise multiplication result between the first vector and the second vector.

11. The method of claim 10, wherein the generating of the ciphertext for the third vector comprises generating the ciphertext for the third vector by computing the ciphertext for the first vector with the second vector in an encrypted state.

12. The method of claim 10, wherein the universal set is a set including n data as elements or a set including n sets each including m elements as elements, wherein m is a natural number satisfying m>2.

* * * * *

UNITED STATES PATENT AND TRADEMARK OFFICE
CERTIFICATE OF CORRECTION

PATENT NO. : 11,329,798 B2
APPLICATION NO. : 17/079982
DATED : May 10, 2022
INVENTOR(S) : Jin Hyuck Jeong et al.

It is certified that error appears in the above-identified patent and that said Letters Patent is hereby corrected as shown below:

In the Claims

Claim 1: Column 13, Line 21 currently appears as:
"value 5 corresponding to each element included in the"
Should read as:
"value corresponding to each element included in the"
Claim 4: Column 13, Line 59 currently appears as:
"value 5 corresponding to each element included in the"
Should read as:
"value corresponding to each element included in the"
Claim 7: Column 14, Line 31 currently appears as:
"n values and in which a value 5 corresponding to each"
Should read as:
"n values and in which a value corresponding to each"
Claim 10: Column 14, Lines 67 currently appears as:
"n values and in which a value 5 corresponding to each"
Should read as:
"n values and in which a value corresponding to each"

Signed and Sealed this
Twenty-fifth Day of April, 2023

Katherine Kelly Vidal
*Director of the United States Patent and Trademark Office*